Dec. 31, 1935.    G. JAECKEL    2,026,176

MAGNIFYING GLASS

Filed June 5, 1934

Inventor:
Georg Jaeckel

Patented Dec. 31, 1935

2,026,176

UNITED STATES PATENT OFFICE 2,026,176

MAGNIFYING GLASS

Georg Jaeckel, Berlin-Zehlendorf, Germany, assignor to the firm Sendlinger Optische Glaswerke G. m. b. H., Berlin-Zehlendorf, Germany Application June 5, 1934, Serial No. 729,061
In Germany June 7, 1933

3 Claims. (Cl. 88—39)

The present invention refers to a magnifying glass which consists of one single glass body and is placed direct on the object to be magnified, for instance on reading matter, fabric and the like.

Experience proves that it is necessary to provide the best possible illumination for the surface to be magnified, because the perceptibility of the details of the object depends not only upon linear magnification but, very much, also upon illumination. Magnifying glasses to be placed on the object direct are already known, but with all these glasses the illumination is neglected, importance being attached only to very strong magnification and absence of distortion.

To improve the illumination of the surface to be magnified, special sources of light have been used, or the lateral surfaces of a glass body of this kind to be placed on the object have been roughened. However, the use of a source of light complicates the instrument to a large extent and, on the other hand, rough surfaces entail the disadvantage that only a small part of the light they diffuse really strikes the object to be magnified and that they are easily soiled and thus cause a further diminution of luminous intensity. Moreover, the known magnifying glasses are subject to the inconvenience that the greater part of the light is kept away by the observer's head, the spherical surface, which is next to the observer, therefore transmitting only very little light to that part of the object which is to be magnified.

My invention overcomes all these difficulties without use being made of any auxiliary means. I have found out that providing a lens of this kind with a spherical surface of special construction and giving the glass body of this lens a definite medial thickness makes the spherical surface direct to the object under examination twice the quantity of light striking those parts of the object which do not lie beneath the lens, experiments having proved that a glass body which receives from all sides light through a convex surface in the form of a calotte whose aperture is at an angle of approximately 70° relatively to the axis has a spot at which the luminous intensity per superficial unit is greatest. The fact that the observer's head is in the way of the light rays incident in the direction of the optical axis is only of secondary importance in a lens having the said aperture.

I have discovered that light rays which enter all sides of a body of this description do not penetrate the interior of this body uniformly, and that all incident rays traverse at a definite height in this body a common cross-sectional area, in which they are intensified. Accordingly, the light rays traversing the glass body are constricted in the said area and diverged to larger cross-sectional areas at greater distances from the spherical surface. It is a feature of my invention that the lens body is given such a medial thickness as to make the surface resting against the object to be magnified lie in that plane in which all light rays have a common cross-sectional area. With a refractive index of for instance 1.52, the medial thickness is greater than, and at most equal to one and a half times, the radius of curvature, the most favorable conditions being arrived at with a medial thickness of 1.25 r. With glasses of other refractive indices and with artificial glasses, for instance pallopase, the distances corresponding to the respective refractive indices may be determined graphically or numerically. A glass body having a bounding surface at the place of the greatest constriction of the light provides the best possible luminous intensity for the object.

Another feature of my invention consists in this that the convex entrance surface for the light is so dimensioned that all light pencils which enter obliquely and assume angles of incidence of up to 90° are made use of completely for the illumination of the object. It is therefore of importance that the convex surface is not restricted in size by a vignette or recesses.

A further feature of my invention consists in this that that surface which lies against the object to be magnified is slightly concave, and this with a view to preventing its being scratched when placed on the object.

A further feature of my invention consists in providing a scale on that surface of the glass body which lies against the object.

A preferable constructional form of the object of my invention is described in detail with reference to the accompanying drawing.

In the accompanying drawing, which illustrates my invention, Figure 1 is a schematical reproduction of the ray path through the longitudinal section of a glass body having a convex light entrance surface according to my invention.

Figure 1:
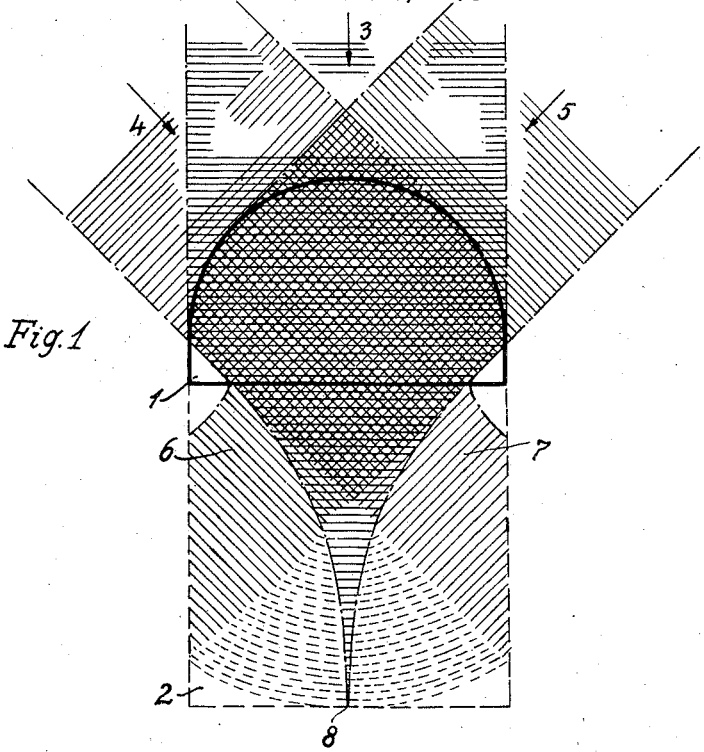

In Figure 1, the part 1 represents a section through the lens body proper according to my invention, the part 1 together with the part 2, which is illustrated in dash-lines, representing a section through a glass body, which corresponds to that of the known lenses to be placed on the object direct. An axially parallel ray pencil 3 and oblique light pencils 4 and 5 traverse the convex surface of the lens body. The rays of the oblique light pencil 5, which is made use of at angles of incidence of 90°, transverse the glass piece 2 within a field 6, and those of the oblique light pencil 4 traverse this piece within the field 7, whereas the axially parallel rays are combined in the optical axis, the rays incident close to the axis being converged at the focus 8. Figure 1 shows clearly that the rays of the oblique as well as of the axially parallel ray pencil traverse a common cross-sectional area in the plane of separation between 1 and 2. Also when the observer's head stops down the axially parallel pencil 3, this plane is exposed to a luminous intensity which is twice as great as that in the glass body 2, at a greater distance from the convex entrance surface, because the different refracted pencils of light separate from each other in this latter case. It is of importance that the spherical calotte bounding the body 1 has a free surface which permits to use for the illumination in the plane of separation 1 and 2 also oblique rays which strike comparatively steeply up to angles of 90°. Figure 1 also shows very clearly that the light pencils 6 and 7 in the known magnifying glasses to be placed direct on the object illuminate only a marginal zone when the axially parallel rays are shut off.

Figure 2:
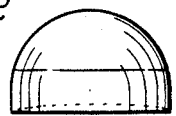
Figure 2 represents the view of the bare glass body representing a lens.

Figure 2 shows a special constructional form of a lens according to my invention. The spherical calotte is integral with a cylindrical part. Without departing from the idea of my invention, this part may naturally be given any other form with circular cross section.

Figure 3:
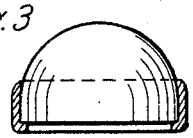
Figure 3 illustrates the glass body according to Figure 2 in a mount.

As an illumination may not be effected by means of those parts of the glass body which lie below the spherical calotte, the lens may be placed in a mount according to Figure 3.

Figure 4:
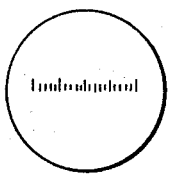
Figure 4 shows the top view of a lens with circular cross section.
Figure 5:
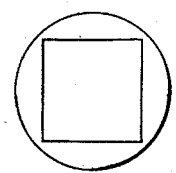
Figure 5 shows the top view of a lens whose non-convex part has four plane bounding surfaces.

That part of the lens which is connected to the spherical calotte has preferably a circular cross-sectional form according to Figure 4. If so desired, at least part of the attachment piece may have a square cross-section according to Figure 5. In Figure 4 is indicated a scale 9 provided on the lower surface of the lens.

I claim:

1. A magnifying glass to be placed direct on the body to be examined and whose surface facing the observer is a calotte the aperture of which is at an angle of approximately 70° relatively to the axis, the base of the magnifying glass body lying approximately at the place of greatest concentration of all the pencils of light rays falling into the said calotte, the medial thickness of the glass body being greater than the radius of curvature and at most equal to one-and-a-half times the radius of curvature.

2. In a magnifying glass according to claim 1, a scale disposed on the surface which rests against the body to be magnified.

3. In a magnifying glass according to claim 1, a mount surrounding the lower portion of the glass body.

GEORG JAECKEL.